W. S. DOWELL.
OIL BURNER.
APPLICATION FILED MAY 21, 1910.
983,484.
Patented Feb. 7, 1911.
2 SHEETS—SHEET 2.
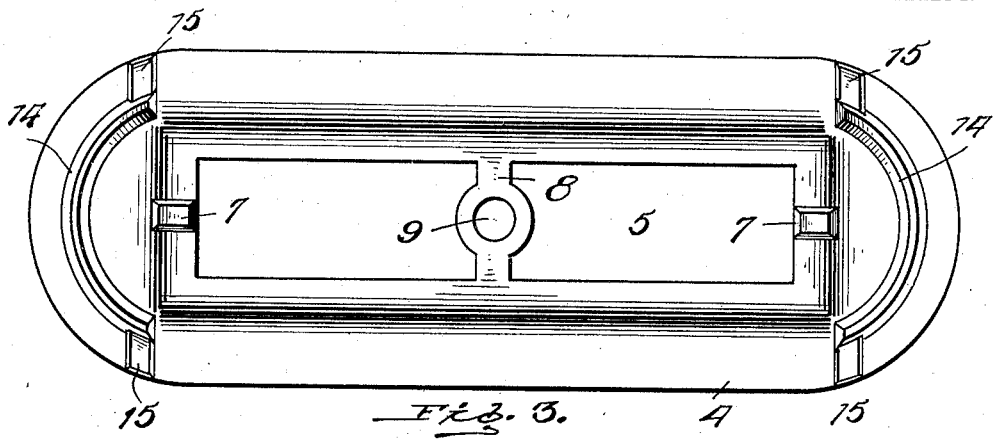
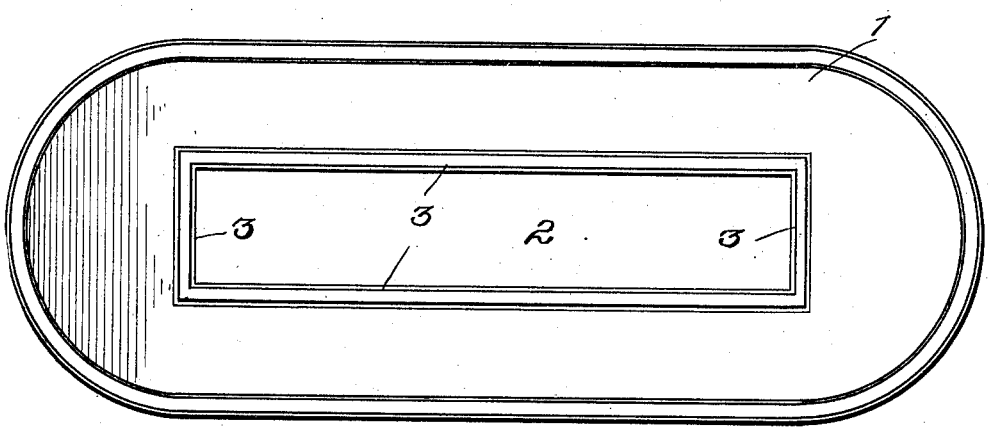
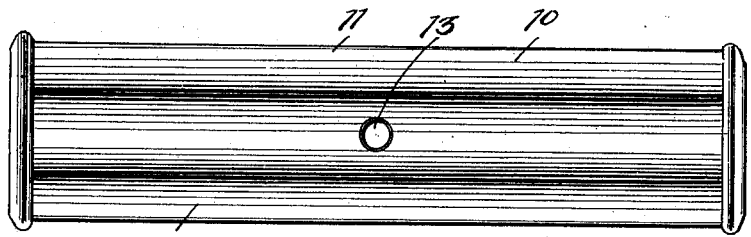
Witnesses
Inventor
William S. Dowell.
By his Attorney.
THE NORRIS PETERS CO., WASHINGTON, D. C.

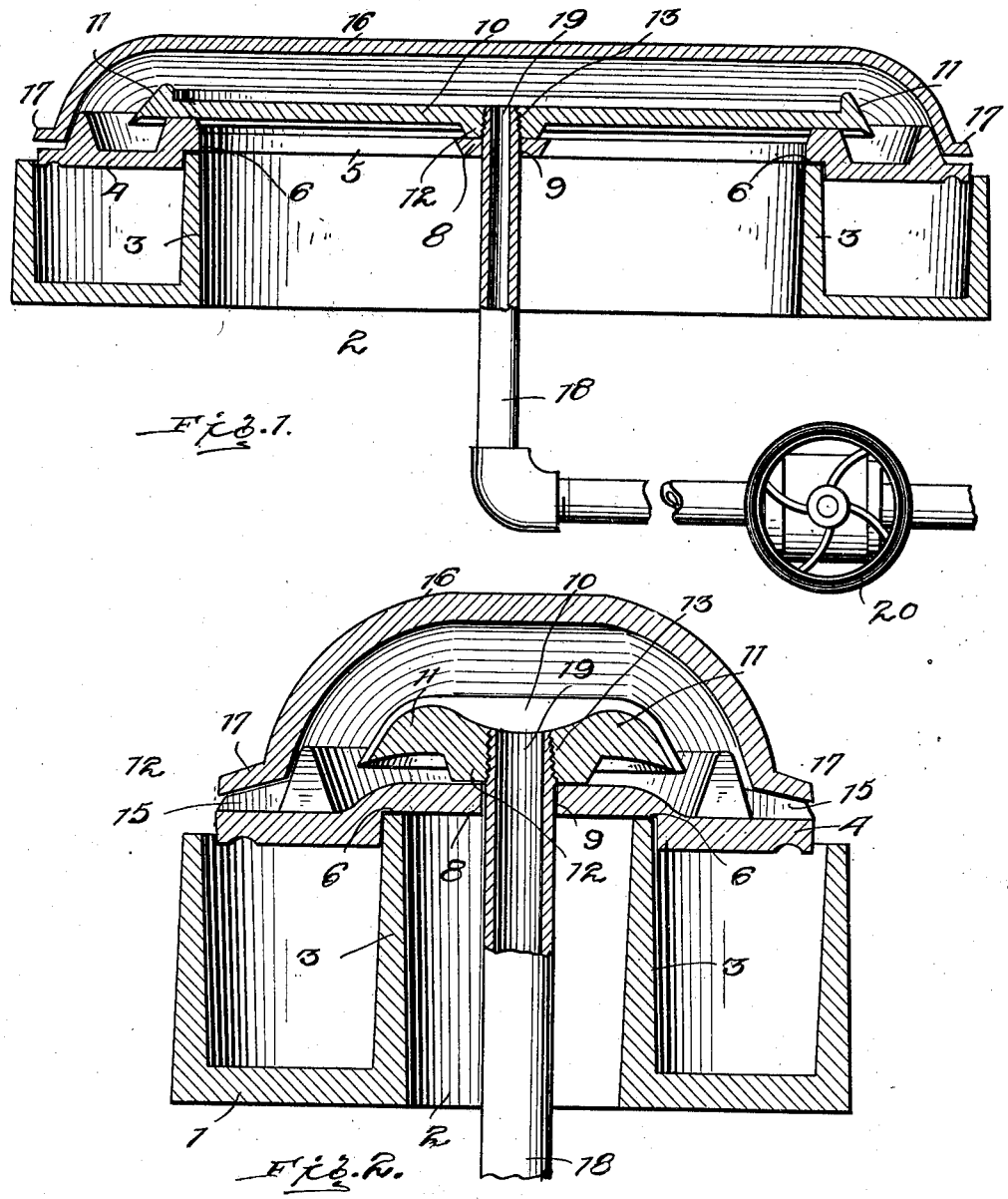

UNITED STATES PATENT OFFICE.

WILLIAM S. DOWELL, OF EL RENO, OKLAHOMA.

OIL-BURNER.

983,484.

Specification of Letters Patent.  Patented Feb. 7, 1911.

Application filed May 21, 1910. Serial No. 562,659.

*To all whom it may concern:*

Be it known that I, WILLIAM S. DOWELL, a citizen of the United States of America, residing at El Reno, in the county of Canadian and State of Oklahoma, have invented certain new and useful Improvements in Oil-Burners, of which the following is a specification, reference being had therein to the accompanying drawing.

This invention relates to oil burners, and the principal object of the same is to provide a burner of separable parts which may be readily separated to permit thorough cleaning thereof and which when assembled provides for the complete combustion of the fuel so that the maximum of heat may be obtained with the minimum expenditure of fuel.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a central vertical longitudinal sectional view of the improved burner. Fig. 2 is a central vertical transverse sectional view of the burner. Fig. 3 is a top plan view of a support for the burner cup which is also adapted to receive the overflow from said cup. Fig. 4 is a top plan view of the pan forming the base of the burner. Fig. 5 is a top plan view of the burner cup.

Referring to said accompanying drawings by numerals, it will be observed that the improved burner is composed of a base pan 1 having an open center 2 that is surrounded by an upstanding guard flange 3. An overflow trough 4 is provided with a central opening 5 that preferably corresponds in shape and size to the open center 2 of base pan 1, said trough being provided with shoulders 6 which are adapted to be seated on flange 3. Said trough extends over and partially closes pan 1, a sufficient space being left between the outer edge of trough 4 and the outer wall of pan 1 so that fuel which may overflow from trough 4 will be caught by the pan. Said trough is provided with rest lugs 7 at its ends and the center opening 5 is transversely spanned by a bar 8 the enlarged central portion of which is provided with a guide opening 9.

A burner cup 10 is supported over the central opening of trough 4 by the lugs 7 so that air may circulate through said opening and between the trough and cup. Said cup is surrounded by a beveled wall 11 and is provided with a central pendent lug 12 that rests on bar 8 and through which a threaded opening 13 is formed that alines with the opening 9 of said bar.

Trough 4 is provided with a guard flange 14 adjacent each end, said flanges conforming to the contour of the ends of said trough. Rest lugs 15 are carried by said trough adjacent the ends of said flanges. A cap 16 is fitted over the trough 4 and cup 10, said cap providing a combustion chamber the base of which is said cup and trough. Flattened flanges 17 are carried by said cap and rest on lugs 15 when the cap is fitted over the trough and cup.

A fuel supply pipe 18 has a threaded end 19 passed through the guide opening 9 of trough bar 8 and engaged with the threaded opening 13 of cup 10. Said pipe extends from a source of fuel supply, not shown, and is equipped with a controlling valve 20.

It will be seen from the foregoing that the fuel is fed to the cup 10 and ignited and the flames will be deflected by the cap 16 so that they will escape between the outer edge of said cap and the trough 4. As will be obvious, the deflecting of the products of combustion by said cap causes a complete combustion of the fuel fed to the cap and also causes the fuel that may have escaped to the trough to be consumed. It will also be seen that in the event of the fuel overflowing the trough, the fuel will be caught in pan 1.

The trough 4 is loosely seated on pan 1, the cup 10 is held to said trough by the supply pipe 18 and the cap 16 is loosely seated over the cup 10 and trough 4 so that all parts may be readily removed when necessary or desirable.

In the accompanying drawings, the improved burner has been shown shaped to especially adapt it for use in connection with the fire chamber of a cooking stove, but it is to be understood that when used in connection with other types of stoves, the burner will be shaped in a manner best adapted for the fire chamber thereof.

What I claim as my invention is:—

1. A burner comprising a pan provided with a central opening, said pan being provided with an upstanding flange that surrounds said opening, a trough seated on said flange and provided with a central opening, a bar spanning said trough-opening and provided with an opening, a burner cup seated on said trough over the central opening thereof and provided with a pendent lug that rests on said bar, said lug being provided with a threaded opening that alines with the opening of said bar, a cap supported by said trough and inclosing the trough and cup, and a fuel supply pipe extending through the opening of said bar and engaging the threaded opening of said lug.

2. A burner comprising a pan, a trough seated thereon, said trough and pan being provided with alined openings, said trough being provided with inner and outer rest lugs on its upper surface, a burner cup seated on said inner lugs, and a cap inclosing said trough and cup, said cap being seated on said outer lugs.

3. A burner comprising a base pan, a trough carried thereby, said trough and pan being provided with air openings, a burner cup seated on said trough, and a cap also seated on said trough and inclosing the same and said cup.

In testimony whereof I hereunto affix my signature in presence of two witnesses.

WILLIAM S. DOWELL.

Witnesses:
J. D. CLEVENGER,
P. B. EWAN.